(12) United States Patent
Galligan

(10) Patent No.: US 8,942,535 B1
(45) Date of Patent: Jan. 27, 2015

(54) IMPLICIT VIDEO LOCATION AUGMENTATION

(71) Applicant: Google Inc., Mountain View, CA (US)

(72) Inventor: Francis William Galligan, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/856,789

(22) Filed: Apr. 4, 2013

(51) Int. Cl.
*H04N 5/932* (2006.01)
*H04N 9/79* (2006.01)

(52) U.S. Cl.
CPC .................................... *H04N 9/79* (2013.01)
USPC ........................................ 386/210; 386/224

(58) Field of Classification Search
None
See application file for complete search history.

(56) References Cited

U.S. PATENT DOCUMENTS

| 7,945,576 | B2 | 5/2011 | Brown | |
|---|---|---|---|---|
| 2005/0063563 | A1 | 3/2005 | Soliman | |
| 2011/0235923 | A1* | 9/2011 | Weisenburger et al. | 382/201 |
| 2013/0018881 | A1* | 1/2013 | Bhatt | 707/736 |
| 2013/0307873 | A1* | 11/2013 | Blanchflower et al. | 345/632 |

OTHER PUBLICATIONS

David Marimon, T. Adamek, A. Bonnin and T. Trzcinski, Enhancing global positioning by image recognition, IEEE International Symposium on Mixed and Augmented Reality (ISMAR), Workshop on Enabling Large-Scale Outdoor Mixed Reality and Augmented Reality, Basel, Switzerland, 2011.
Evangelos Kalogerakis, Olga, Vesselova, James Hays, Alexei A. Efros, Aaron Hertzmann, Image Sequence Geolocation with Human Travel Priors, Proceedings of the IEEE Int'l Conference on Computer Vision Recognition (ICCV), 2009.
Yi-Cheng Song, Web Video Geolocation by Geotagged Social Resources, IEEE Transactions on Multimedia, Apr. 2012, vol. 14, Issue 2, pp. 456-470.

* cited by examiner

*Primary Examiner* — William C Vaughn, Jr.
*Assistant Examiner* — Eileen Adams
(74) *Attorney, Agent, or Firm* — Young Basile Hanlon & MacFarlane P.C.

(57) ABSTRACT

A method and apparatus for performing implicit video location augmentation are provided. Implicit video location augmentation may include identifying a first geolocation for a first frame from a plurality of video frames based on a first image captured by the first frame, identifying a second geolocation for a second frame from the plurality of video frames based on a second image captured by the second frame, determining, by a processor, a third geolocation for a third frame from the plurality of video frames based on the first geolocation and the second geolocation, and storing an updated plurality of video frames such that the first frame is associated with the first geolocation, the second frame is associated with the second geolocation, and the third frame is associated with the third geolocation.

17 Claims, 4 Drawing Sheets

IMPLICIT VIDEO LOCATION AUGMENTATION

TECHNICAL FIELD

This application relates to video editing.

BACKGROUND

Digital video can be used, for example, for remote business meetings via video conferencing, high definition video entertainment, video advertisements, or sharing of user-generated videos. Accordingly, it would be advantageous to provide location information for videos captured without accurate location information.

SUMMARY

Disclosed herein are aspects of systems, methods, and apparatuses for implicit video location augmentation.

An aspect is a method for implicit video location augmentation which may include identifying a first geolocation for a first frame from a plurality of video frames based on a first image captured by the first frame, identifying a second geolocation for a second frame from the plurality of video frames based on a second image captured by the second frame, determining, by a processor, a third geolocation for a third frame from the plurality of video frames based on the first geolocation and the second geolocation, and storing an updated plurality of video frames such that the first frame is associated with the first geolocation, the second frame is associated with the second geolocation, and the third frame is associated with the third geolocation.

Another aspect is a method for implicit video location augmentation which may include receiving an input video including the plurality of video frames from an external device, identifying a first geolocation for a first frame from a plurality of video frames based on a first image captured by the first frame by detecting a geolocatable feature in the first image, identifying a previously geolocated orientation feature corresponding to the geolocatable feature based on a similarity between the geolocatable feature and the orientation feature, wherein the orientation feature is associated with previously identified geolocation information, and generating a confidence indicator indicating a likelihood that the identified first geolocation is accurate. The method for implicit video location augmentation may include identifying a second geolocation for a second frame from the plurality of video frames based on a second image captured by the second frame, determining, by a processor, a third geolocation for a third frame from the plurality of video frames based on the first geolocation and the second geolocation, storing an updated plurality of video frames such that the first frame is associated with the first geolocation, the second frame is associated with the second geolocation, and the third frame is associated with the third geolocation, and transmitting an output video including the updated plurality of video frames to the external device.

Another aspect is a method for implicit video location augmentation which may include receiving an input video including the plurality of video frames from an external device, identifying a plurality of geolocations for a first frame from a plurality of video frames based on a first image captured by the first frame by detecting a geolocatable feature in the first image, identifying a plurality of previously geolocated orientation features corresponding to the geolocatable feature based on a similarity between the geolocatable feature and each respective orientation feature from the plurality of orientation features, wherein the respective orientation features are associated with previously identified geolocation information, and for each orientation feature in the plurality of orientation features, generating a confidence indicator indicating a likelihood that the respective geolocation information is accurate. The method of implicit video location augmentation may include identifying a geolocation for a second frame from the plurality of video frames based on a second image captured by the second frame, determining, by a processor, a geolocation for the first frame based on the plurality of geolocations identified for the first frame and the second geolocation, storing an updated plurality of video frames such that the first frame is associated with the first geolocation, the second frame is associated with the second geolocation, and the third frame is associated with the third geolocation, and transmitting an output video including the updated plurality of video frames to the external device.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Digital video may be used for various purposes including, for example, remote business meetings via video conferencing, high definition video entertainment, video advertisements, and sharing of user-generated videos. In some implementations, a video may include explicit contextual information, such as temporal and geolocation information. The explicit contextual information may be generated and associated with the video concurrently with capturing and recording the video. For example, geolocation information may be identified using a global positioning system (GPS) device included in a video camera.

In some cases, explicit geolocation information, such as GPS coordinates or radio triangulation coordinates may not be available as a video is being captured. For example, GPS signal reception may fail, or the video camera may not include a GPS receiver. Furthermore, explicit geolocation identification may lack precision.

Implicit video location augmentation may include augmenting video that does not include explicit geolocation information, or include inaccurate, incomplete, or imprecise geolocation information based on inspection of the content captured in the video.

For example, a video camera that does not have geolocation identification capabilities may be used to capture a video of a person skiing down a mountain. Subsequently, the video may be uploaded to an implicit video location augmentation server and implicit video location augmentation may be performed to identify geolocation information for the video based on the content captured in the video.

Figure 1:
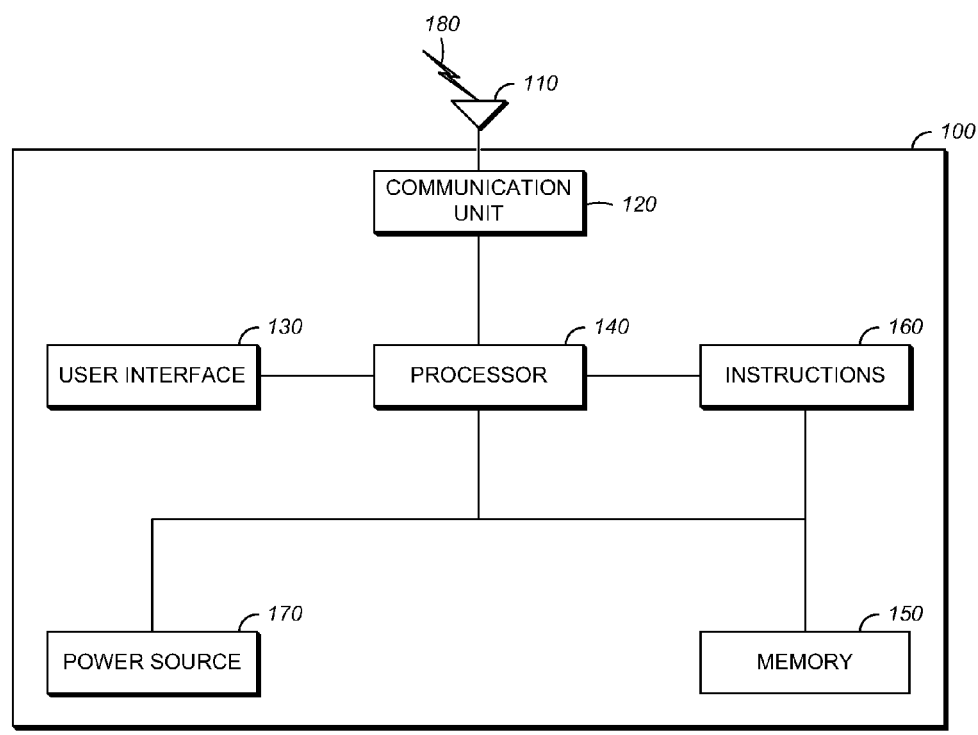
FIG. 1 is a diagram of a computing device in accordance with implementations of this disclosure.

FIG. 1 is a diagram of a computing device 100 in accordance with implementations of this disclosure. A computing device 100 can include a communication interface 110, a communication unit 120, a user interface (UI) 130, a processor 140, a memory 150, instructions 160, a power source 170, or any combination thereof. As used herein, the term "computing device" includes any unit, or combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one or more element of the communication device 100 can be integrated into any number of separate physical units. For example, the UI 130 and processor 140 can be integrated in a first physical unit and the memory 150 can be integrated in a second physical unit.

The communication interface 110 can be a wireless antenna, as shown, a wired communication port, such as an Ethernet port, an infrared port, a serial port, or any other wired or wireless unit capable of interfacing with a wired or wireless electronic communication medium 180.

The communication unit 120 can be configured to transmit or receive signals via a wired or wireless medium 180. For example, as shown, the communication unit 120 is operatively connected to an antenna configured to communicate via wireless signals. Although not explicitly shown in FIG. 1, the communication unit 120 can be configured to transmit, receive, or both via any wired or wireless communication medium, such as radio frequency (RF), ultra violet (UV), visible light, fiber optic, wire line, or a combination thereof. Although FIG. 1 shows a single communication unit 120 and a single communication interface 110, any number of communication units and any number of communication interfaces can be used.

The UI 130 can include any unit capable of interfacing with a user, such as a virtual or physical keypad, a touchpad, a display, a touch display, a speaker, a microphone, a video camera, a sensor, or any combination thereof. The UI 130 can be operatively coupled with the processor, as shown, or with any other element of the communication device 100, such as the power source 170. Although shown as a single unit, the UI 130 may include one or more physical units. For example, the UI 130 may include an audio interface for performing audio communication with a user, and a touch display for performing visual and touch based communication with the user. Although shown as separate units, the communication interface 110, the communication unit 120, and the UI 130, or portions thereof, may be configured as a combined unit. For example, the communication interface 110, the communication unit 120, and the UI 130 may be implemented as a communications port capable of interfacing with an external touchscreen device.

The processor 140 can include any device or system capable of manipulating or processing a signal or other information now-existing or hereafter developed, including optical processors, quantum processors, molecular processors, or a combination thereof. For example, the processor 140 can include a general purpose processor, a special purpose processor, a conventional processor, a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors. The processor can be operatively coupled with the communication interface 110, communication unit 120, the UI 130, the memory 150, the instructions 160, the power source 170, or any combination thereof.

The memory 150 can include any non-transitory computer-usable or computer-readable medium, such as any tangible device that can, for example, contain, store, communicate, or transport the instructions 160, or any information associated therewith, for use by or in connection with the processor 140. The non-transitory computer-usable or computer-readable medium can be, for example, a solid state drive, a memory card, removable media, a read only memory (ROM), a random access memory (RAM), any type of disk including a hard disk, a floppy disk, an optical disk, a magnetic or optical card, an application specific integrated circuits (ASICs), or any type of non-transitory media suitable for storing electronic information, or any combination thereof. The memory 150 can be connected to, for example, the processor 140 through, for example, a memory bus (not explicitly shown).

The instructions 160 can include directions for performing any method, or any portion or portions thereof, disclosed herein. The instructions 160 can be realized in hardware, software, or any combination thereof. For example, the instructions 160 may be implemented as information stored in the memory 150, such as a computer program, that may be executed by the processor 140 to perform any of the respective methods, algorithms, aspects, or combinations thereof, as described herein. The instructions 160, or a portion thereof, may be implemented as a special purpose processor, or circuitry, that can include specialized hardware for carrying out any of the methods, algorithms, aspects, or combinations thereof, as described herein. Portions of the instructions 160 can be distributed across multiple processors on the same machine or different machines or across a network such as a local area network, a wide area network, the Internet, or a combination thereof.

The power source 170 can be any suitable device for powering the communication device 110. For example, the power source 170 can include a wired power source; one or more dry cell batteries, such as nickel-cadmium (NiCd), nickel-zinc (NiZn), nickel metal hydride (NiMH), lithium-ion (Li-ion); solar cells; fuel cells; or any other device capable of powering the communication device 110. The communication interface 110, the communication unit 120, the UI 130, the processor 140, the instructions 160, the memory 150, or any combination thereof, can be operatively coupled with the power source 170.

Although shown as separate elements, the communication interface 110, the communication unit 120, the UI 130, the processor 140, the instructions 160, the power source 170, the memory 150, or any combination thereof can be integrated in one or more electronic units, circuits, or chips.

Figure 2:
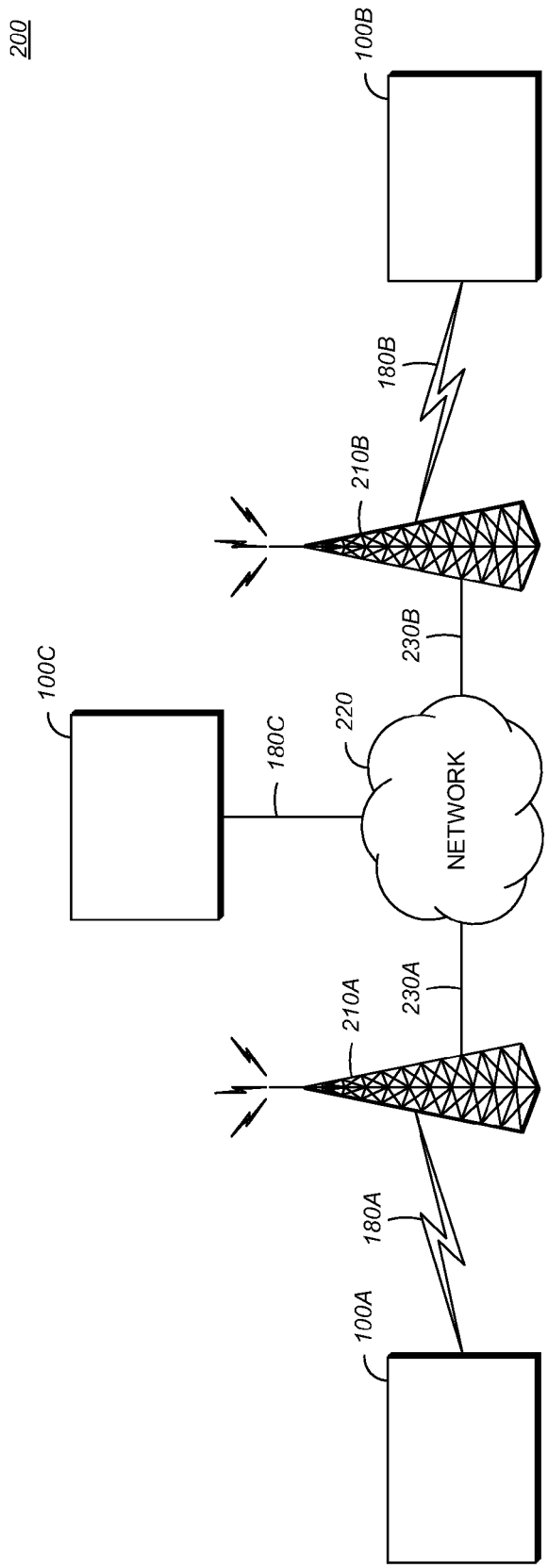
FIG. 2 is a diagram of a computing and communications system in accordance with implementations of this disclosure.

FIG. 2 is a diagram of a computing and communications system 200 in accordance with implementations of this disclosure. The computing and communications system 200 may include one or more computing and communication devices 100A/100B/100C, one or more access points 210A/210B, one or more networks 220, or a combination thereof. For example, the computing and communication system 200 can be a multiple access system that provides communication, such as voice, data, video, messaging, broadcast, or a combination thereof, to one or more wired or wireless communicating devices, such as the computing and communication devices 100A/100B/100C. Although, for simplicity, FIG. 2 shows three computing and communication devices 100A/100B/100C, two access points 210A/210B, and one network 220, any number of computing and communication devices, access points, and networks can be used.

A computing and communication device 100A/100B/100C can be, for example, a computing device, such as the computing device 100 shown in FIG. 1. For example, as shown the computing and communication devices 100A/100B may be user devices, such as a mobile computing device, a laptop, a thin client, or a smartphone, and computing and the communication device 100C may be a server, such as a mainframe or a cluster. Although the computing and communication devices 100A/100B are described as user devices, and the computing and communication device 100C is described as a server, any computing and communication device may perform some or all of the functions of a server, some or all of the functions of a user device, or some or all of the functions of a server and a user device.

Each computing and communication device 100A/100B/100C can be configured to perform wired or wireless communication. For example, a computing and communication device 100A/100B/100C can be configured to transmit or receive wired or wireless communication signals and can include a user equipment (UE), a mobile station, a fixed or mobile subscriber unit, a cellular telephone, a personal computer, a tablet computer, a server, consumer electronics, or any similar device. Although each computing and communication device 100A/100B/100C is shown as a single unit, a computing and communication device can include any number of interconnected elements.

Each access point 210A/210B can be any type of device configured to communicate with a computing and communication device 100A/100B/100C, a network 220, or both via wired or wireless communication links 180A/180B/180C. For example, an access point 210A/210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A/210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the Hyper Text Transport Protocol (HTTP), or a combination thereof.

The computing and communication devices 100A/100B/100C can communicate with each other via the network 220 using one or more a wired or wireless communication links, or via a combination of wired and wireless communication links. For example, as shown the computing and communication devices 100A/100B can communicate via wireless communication links 180A/180B, and computing and communication device 100C can communicate via a wired communication link 180C. Any of the computing and communication devices 100A/100B/100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A/210B can communicate with the network 220 via one or more types of wired or wireless communication links 230A/230B. Although FIG. 2 shows the computing and communication devices 100A/100B/100C in communication via the network 220, the computing and communication devices 100A/100B/100C can communicate with each other via any number of communication links, such as a direct wired or wireless communication link.

Other implementations of the computing and communications system 200 are possible. For example, in an implementation the network 220 can be an ad-hock network and can omit one or more of the access points 210A/210B. The computing and communications system 200 may include devices, units, or elements not shown in FIG. 2. For example, the computing and communications system 200 may include many more communicating devices, networks, and access points.

Figure 3:
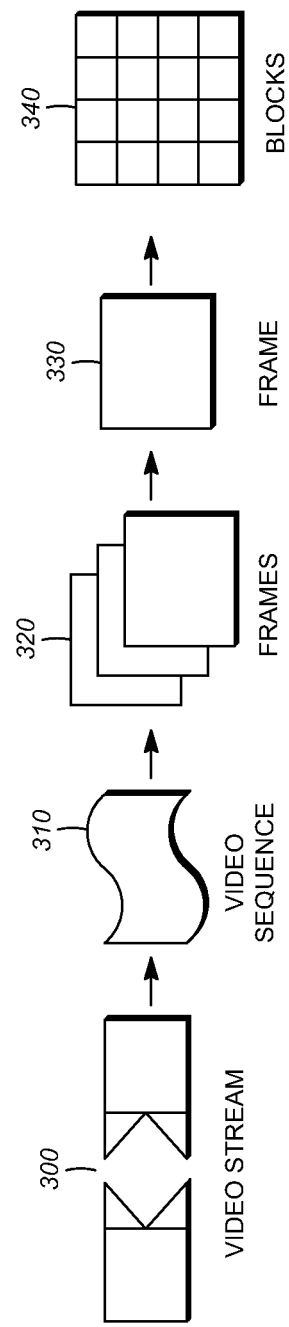
FIG. 3 is a diagram of a video stream for use in frame interpolation in accordance with implementations of this disclosure.

FIG. 3 is a diagram of a video stream 300 for use in encoding, decoding, frame interpolation, or any combination thereof, in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320. Each frame 330 from the adjacent frames 320 may represent a single image from the video stream. A frame 330 may include blocks 340. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 4:
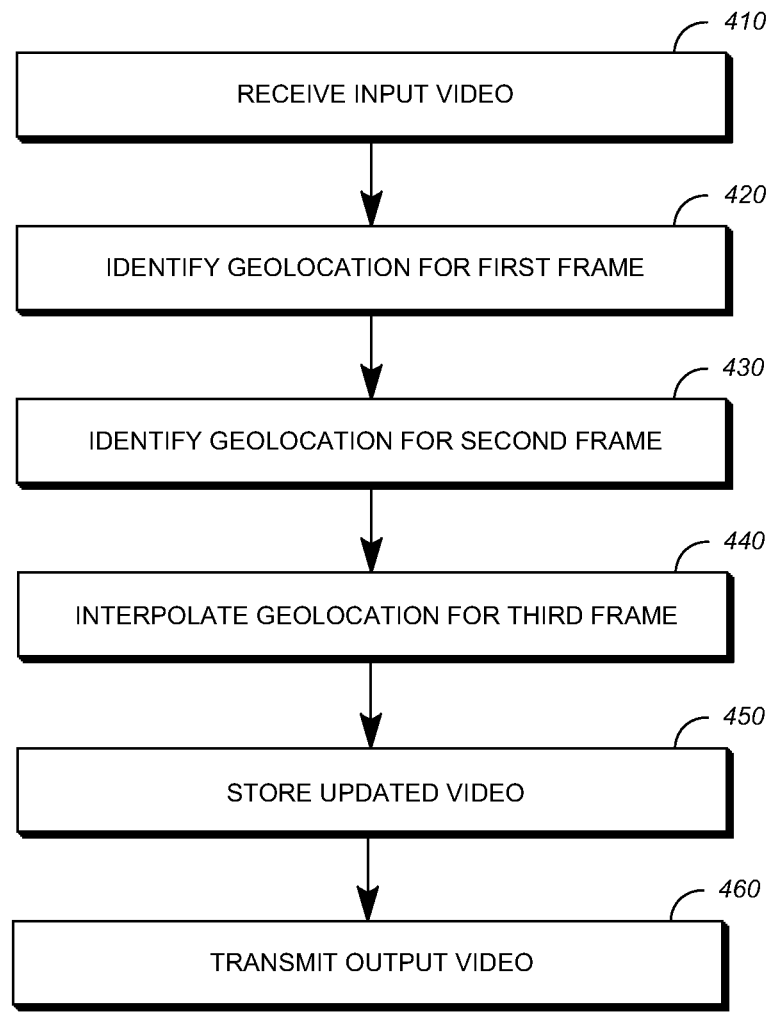
FIG. 4 shows a diagram of an example of implicit video location augmentation in accordance with implementations of this disclosure.

FIG. 4 shows a diagram of an example of implicit video location augmentation in accordance with implementations of this disclosure. In some implementations, implicit video location augmentation may include receiving an input video at 410, identifying a geolocation for a first frame of the input video at 420, identifying a geolocation for a second frame of the input video at 430, interpolating a geolocation for a third frame of the input video at 440, storing an updated video at 450, transmitting the updated video at 460, or any combination thereof.

Video may be captured and stored with accompanying explicit geolocation information, such as longitude, latitude, and elevation. For example, a device, such as the computing device 100 shown in FIG. 1, may include a video capturing unit, such as a camera, and a geolocation unit, such as a global positioning system (GPS) unit or a radio triangulation unit. The device may capture a video sequence, such as the video stream 300 shown in FIG. 3. The device may capture explicit geolocation information corresponding to the location of the device at the time the video is captured. The explicit geolocation information may be stored with the video.

In some implementations, a device may not include a geolocation unit or other means for directly capturing explicit geolocation information. For example, the device may capture and store a video without explicit geolocation information. In some implementations, the device may include a geolocation unit or other means for directly capturing explicit geolocation information and may capture and store a video, or a portion of a video, without explicit geolocation information. For example, the device may include a GPS unit and GPS information may be inaccessible during a portion of the period the video is captured.

Implicit video location augmentation may be performed to augment video captured and recorded without explicit geolocation information by identifying implicit geolocation information and storing the identified geolocation information as explicit geolocation information with the video. For example, the geolocation information identified implicitly may be stored explicitly as metadata in a header of the video or in a header associated with each frame of the video.

In some implementations, video capture and implicit video location augmentation may be performed asynchronously. For example, the video, or a portion thereof, may be captured at a device at a first point in time and implicit video location augmentation may be performed independently at a second point in time.

In some implementations, video capture and implicit video location augmentation may be performed substantially synchronously. For example, implicit video location augmentation may be performed periodically as the video is being captured.

In some implementations, an input video may be received at 410. For example, a source device, such as the computing and communication device 100A shown in FIG. 2, may capture and store a video without explicit geolocation information. The stored video may be communicated to a video augmentation device, such as the computing and communication device 100C shown in FIG. 2, via a communication medium, such as the wired or wireless electronic communication medium 180 shown in FIG. 2. Although shown separately, the source device and the video augmentation device may be a single physical unit. Although not shown, the video may be communicated via one or more intermediary devices. For example, the video may be captured at video camera, copied to a personal computer, uploaded to a networked storage device, and sent to a server for implicit video location augmentation.

In some implementations, implicit geolocation information for a first frame of the input video may be identified at 420. Identifying the implicit geolocation information may include inspecting the content captured in the first frame, detecting one or more geolocatable features in the captured content, matching the detected geographic features with previously geolocated geographic features (orientation features), and associating geolocation information associated with the matching orientation features with the detected geographic features.

The geolocatable features may be detected and matched using, for example, image recognition or any other means of distinguishing a geographic feature in a video frame. Although the term geolocatable features is used for simplicity herein, implicit geolocation information may be identified based on any element or elements of the image captured in a video that may be used to identify a geographic location, such as landmarks, structures, captured text, such as a street sign or building name, works of art, or any combination thereof.

In some implementations, identifying implicit geolocation information may include using explicit geolocation information. For example, explicit geolocation information may be used improve the accuracy of matching the detected geographic features with orientation features. In an example, the content of the first frame may include a geographic feature, such as a mountain range. The geographic feature may match, or partially match, with multiple orientation features associated with multiple candidate geographic locations. Explicit geolocation information, such as a country or city, may be used to identify a most likely candidate geographic location based on a degree of similarity between the geolocation information associated with the matching orientation features and the explicit geolocation information. In another example, the explicit geolocation information may indicate a geographic location of a building and the implicit geolocation information may augment the video by indicating a particular room within the building.

In some implementations, identifying the implicit geolocation information may include generating a confidence indicator indicating a likelihood that the identified geographic information is accurate. For example, the content of the first frame may include elements that strongly match with one or a few orientation features and the confidence indicator may indicate a high likelihood that the identified geographic information is accurate. In another example, the content of the first frame may include elements that weakly match with one or a few orientation features, or strongly match with several orientation features, and the confidence indicator may indicate a low likelihood that the identified geographic information is accurate.

In some implementations, a geolocation for a second frame of the input video may be identified at 430. The second frame of the input video may be adjacent to the first frame in the video sequence, or there may be a number of frames between the first frame and the second frame. The number of frames between the first frame and the second frame may be identified based on, for example, a default setting, user input, computational complexity, differences between the frames, the confidence indicator, or any combination thereof. For example, the confidence indicator for the first frame may indicate a high likelihood that the identified geographic information is accurate and the distance between the first frame and the second frame may be large. In another example, the confidence indicator may indicate a low likelihood that the identified geographic information is accurate, and the distance between the first frame and the second frame may be low.

Identifying the implicit geolocation information for the second frame may be similar to identifying the implicit geolocation information for the first frame.

In some implementations, identifying implicit geolocation information for the second frame may include using the implicit geolocation information identified for the first frame. For example, the content of the second frame may include a geographic feature that matches with multiple candidate orientation features and a most likely match may be identified based on a degree of similarity, such as distance, between the geographic information associated with the candidate orientation features and the implicit geolocation information identified for the first frame.

In some implementations, identifying implicit geolocation information for the second frame may include updating the implicit geolocation information identified for the first frame. For example, the content of the first frame may include a geographic feature that matches with a first set of candidate orientation features and the content of the second frame may include a geographic feature that matches with a second set of candidate orientation features. A most likely match may be identified for the first frame, the second frame, or both, based on a degree of similarity between the geographic information associated with the candidate orientation features in the first set and the geographic information associated with the candidate orientation features in the second set.

In some implementations, a geolocation for a third frame of the input video may be interpolated at 440. The third frame may be sequentially before the first frame, between the first frame and the second frame, or after the second frame. The third frame may be adjacent to the first frame, the second frame, or both, or may be a first distance from the first frame and a second distance from the second frame. The first distance may be the same as or different from the second distance. Identifying the geolocation information for the second frame may be similar to identifying the geolocation information for the first and second frames.

In some implementations, identifying implicit geolocation information may include using spatiotemporal interpolation. Identifying implicit geolocation information using spatiotemporal interpolation may include using spatial information, temporal information, or a combination of spatial information and temporal information. The spatial information may include a spatial location, such as an implicit or explicit geolocation. The temporal information may include a temporal location, such as an explicit temporal location, an implicit temporal location, or a combination thereof. For example, an explicit temporal location may include a time stamp, a date stamp, a time stamp and a date stamp, or a time and date stamp, and an implicit temporal location may include a relative position of a frame in the video sequence.

In some implementations, a temporal location may be identified based on inspection of the images captured in one or more frames of the video. For example, a frame may include an image of a clock or the time may be determined based on content such as the angle of the sun. In an example, a first frame may be associated with a first geolocation, which may be implicit or explicit, and a first temporal location, which may include a time indicator, a date indicator, or both. A second frame may be associated with a second geolocation and a second temporal location. Implicit geolocation information may be interpolated for a third frame based on the first geolocation and the second geolocation.

In some implementations, the implicit geolocation information for a frame may be inferred from the geolocation information identified for one or more other frames. For example, implicit geolocation information may be unidentifiable or may be identifiable with low confidence, based on the content of the third frame and implicit geolocation information identified for the first frame, the second frame, or both may be used to interpolate the geolocation information of the third frame. For example, the content of the third frame may not include any identifiable elements, may include elements that do not match with orientation features, or may include elements that match with many orientation features and implicit geolocation information identified for the first frame, the second frame, or both may be used to augment the geolocation information of the third frame.

In an example, implicit geolocation information identified for the first frame may indicate a first geographic location and implicit geolocation information identified for the second frame may indicate a second, distinct, geographic location. The third frame may be between the first frame and the second frame in the video sequence and the content of the third frame may weakly match for multiple candidate geographic locations. A most likely geographic location for the third frame may be selected from the candidate geographic locations based on a degree of similarity between the candidate geographic locations identified for the third frame and the geographic location identified for the first frame and the geographic location identified for the second frame.

In some implementations, an updated video may be stored at 450. For example, the video stream may use a format that supports the inclusion of geolocation information and the geolocation may be stored within the video stream data structure. In addition, or in the alternative, the geolocation information may be stored independently of the video stream, such as in a separate file, and may be associated with the video stream.

In some implementations, the updated video may be transmitted at 460. For example, the updated video, or the independently stored geolocation information, may be communicated to the source device via the communication medium, or another communication medium.

Other implementations of the diagram of implicit video location augmentation as shown in FIG. 4 are available. In implementations, additional elements of implicit video location augmentation can be added, certain elements can be combined, and/or certain elements can be removed. For example, in an implementation, transmitting the updated video at 460 may include transmitting supplementary geographical information, such as a map of the geographic information or information indicating the identified geographic features.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, not all elements of the methods described herein may be required to implement a method in accordance with the disclosed subject matter.

The implementations of encoding and decoding herein illustrate some exemplary techniques. However, it is to be understood that encoding and decoding, as those terms are used herein may include compression, decompression, transformation, or any other processing or change of data.

The implementations of the transmitting station 100A and/or the receiving station 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 100A and the receiving station 100B do not necessarily have to be implemented in the same manner.

Further, in one implementation, for example, the transmitting station 100A or the receiving station 100B can be implemented using a general purpose computer or general purpose/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

The transmitting station 100A and receiving station 100B can, for example, be implemented on computers in a real-time video system. Alternatively, the transmitting station 100A can be implemented on a server and the receiving station 100B can be implemented on a device separate from the server, such as a hand-held communications device. In this instance, the transmitting station 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 100A. Other suitable transmitting station 100A and receiving station 100B implementation schemes are available. For example, the receiving station 100B can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method comprising:
    receiving an input video stream captured by an image capturing device, the input video stream including a plurality of video frames;
    identifying a first plurality of geolocations for a first frame from the plurality of video frames based on content of the first frame, wherein identifying the first plurality of geolocations includes identifying a first geolocation by:
        detecting a geolocatable feature in the content of the first frame, and
        identifying a previously geolocated orientation feature corresponding to the geolocatable feature based on a similarity between the geolocatable feature and the orientation feature, wherein the orientation feature is associated with previously identified geolocation information;
    identifying a second geolocation for a second frame from the plurality of video frames based on content of the second frame;
    determining, by a processor, a third geolocation for a third frame from the plurality of video frames based on the first geolocation and the second geolocation; and
    storing an updated plurality of video frames such that the first frame is associated with the first geolocation, the second frame is associated with the second geolocation, and the third frame is associated with the third geolocation.

2. The method of claim 1, wherein the image capturing device is an external device, the method further comprising:
    transmitting an output video including the updated plurality of video frames to the external device.

3. The method of claim 1, wherein the identifying the second geolocation includes:
    detecting a second geolocatable feature in the content of the second frame; and
    identifying a second previously geolocated orientation feature corresponding to the second geolocatable feature based on a similarity between the second geolocatable feature and the second orientation feature, wherein the second orientation feature is associated with previously identified geolocation information.

4. The method of claim 1, wherein identifying the first geolocation includes:
    for each geolocation in the first plurality of geolocations, generating a confidence indicator indicating a likelihood that the respective geolocation is accurate.

5. The method of claim 1, wherein identifying the first geolocation includes generating a confidence indicator indicating a likelihood that the identified first geolocation is accurate.

6. The method of claim 5, further comprising:
    selecting the second frame from the plurality of frames based on a default setting, user input, computational complexity, a degree of similarity between the frames in the plurality of frames, or the confidence indicator associated with the first frame.

7. The method of claim 1, wherein identifying the third geolocation based on the first geolocation and the second geolocation includes using spatiotemporal interpolation.

8. The method of claim 1, wherein identifying the first geolocation includes identifying an implicit temporal location.

9. A method comprising:
    receiving, from an external device, an input video captured by an external image capturing device, the input video including a plurality of video frames;

identifying a plurality of geolocations for a first frame from the plurality of video frames based on content of the first frame by:
  detecting a geolocatable feature in the content of the first frame,
  identifying a plurality of previously geolocated orientation features corresponding to the geolocatable feature based on a similarity between the geolocatable feature and each respective orientation feature from the plurality of orientation features, wherein the respective orientation features are associated with previously identified geolocation information, and
  for each orientation feature in the plurality of orientation features, generating a confidence indicator indicating a likelihood that the respective geolocation information is accurate;
identifying a geolocation for a second frame from the plurality of video frames based on content of the second frame;
determining, by a processor, a geolocation for the first frame based on the plurality of geolocations identified for the first frame and the second geolocation;
storing an updated plurality of video frames such that the first frame is associated with the first geolocation, the second frame is associated with the second geolocation, and the third frame is associated with the third geolocation; and
transmitting an output video including the updated plurality of video frames to the external device.

10. A method comprising:
receiving an input video stream captured by an image capturing device, the input video stream including a plurality of video frames;
identifying a first geolocation for a first frame from the plurality of video frames based on content of the first frame by:
  detecting a geolocatable feature in the content of the first frame, and
  identifying a previously geolocated orientation feature corresponding to the geolocatable feature based on a similarity between the geolocatable feature and the orientation feature, wherein the orientation feature is associated with previously identified geolocation information;
identifying a second geolocation for a second frame from the plurality of video frames based on content of the second frame by:
  detecting a second geolocatable feature in the content of the second frame, and
  identifying a second previously geolocated orientation feature corresponding to the second geolocatable feature based on a similarity between the second geolocatable feature and the second orientation feature, wherein the second orientation feature is associated with previously identified geolocation information;
determining, by a processor, a third geolocation for a third frame from the plurality of video frames based on the first geolocation and the second geolocation; and
storing an updated plurality of video frames such that the first frame is associated with the first geolocation, the second frame is associated with the second geolocation, and the third frame is associated with the third geolocation.

11. The method of claim 10, wherein the image capturing device is an external device, the method further comprising:
transmitting an output video including the updated plurality of video frames to the external device.

12. The method of claim 10, wherein identifying the first geolocation includes identifying a first plurality of geolocations based on the content of the first frame.

13. The method of claim 12, wherein identifying the first geolocation includes:
for each geolocation in the first plurality of geolocations, generating a confidence indicator indicating a likelihood that the respective geolocation is accurate.

14. The method of claim 10, wherein identifying the first geolocation includes generating a confidence indicator indicating a likelihood that the identified first geolocation is accurate.

15. The method of claim 14, further comprising:
selecting the second frame from the plurality of frames based on a default setting, user input, computational complexity, a degree of similarity between the frames in the plurality of frames, or the confidence indicator associated with the first frame.

16. The method of claim 10, wherein identifying the third geolocation based on the first geolocation and the second geolocation includes using spatiotemporal interpolation.

17. The method of claim 10, wherein identifying the first geolocation includes identifying an implicit temporal location.

* * * * *